A. LAWSON.
TOOL HOLDER.
APPLICATION FILED JUNE 30, 1909.
987,307.
Patented Mar. 21, 1911.
2 SHEETS—SHEET 2.
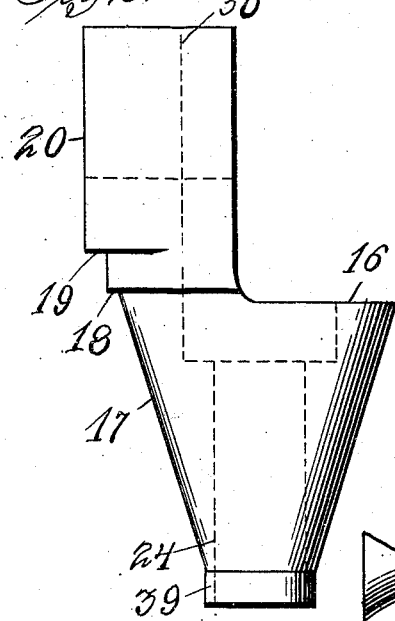
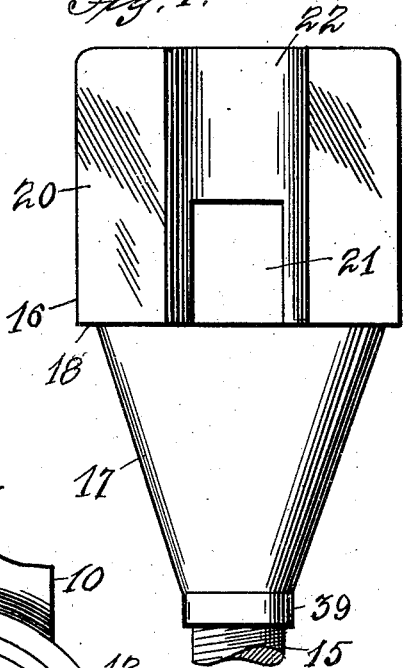
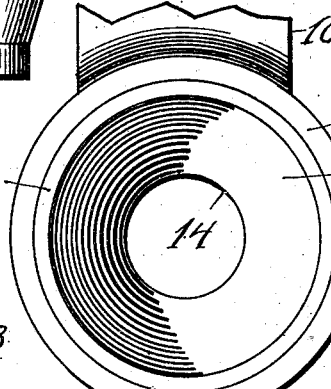
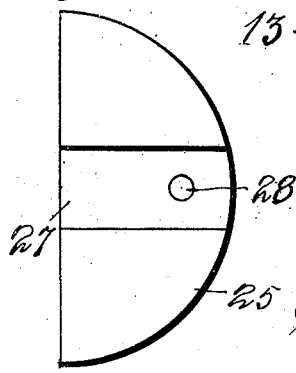
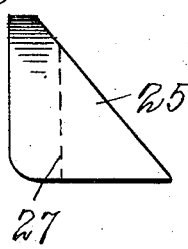
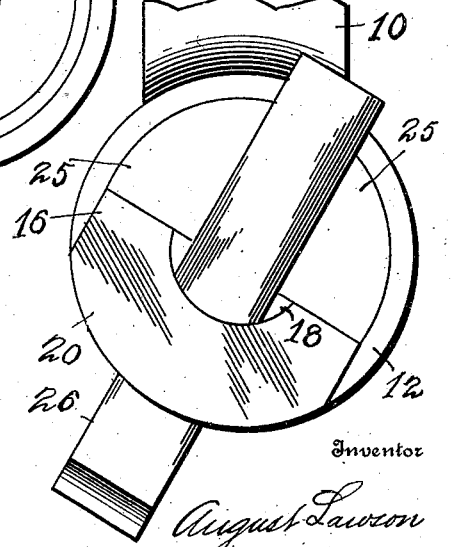
Witnesses
Inventor
August Lawson
By S. Arthur Baldwin
Attorney

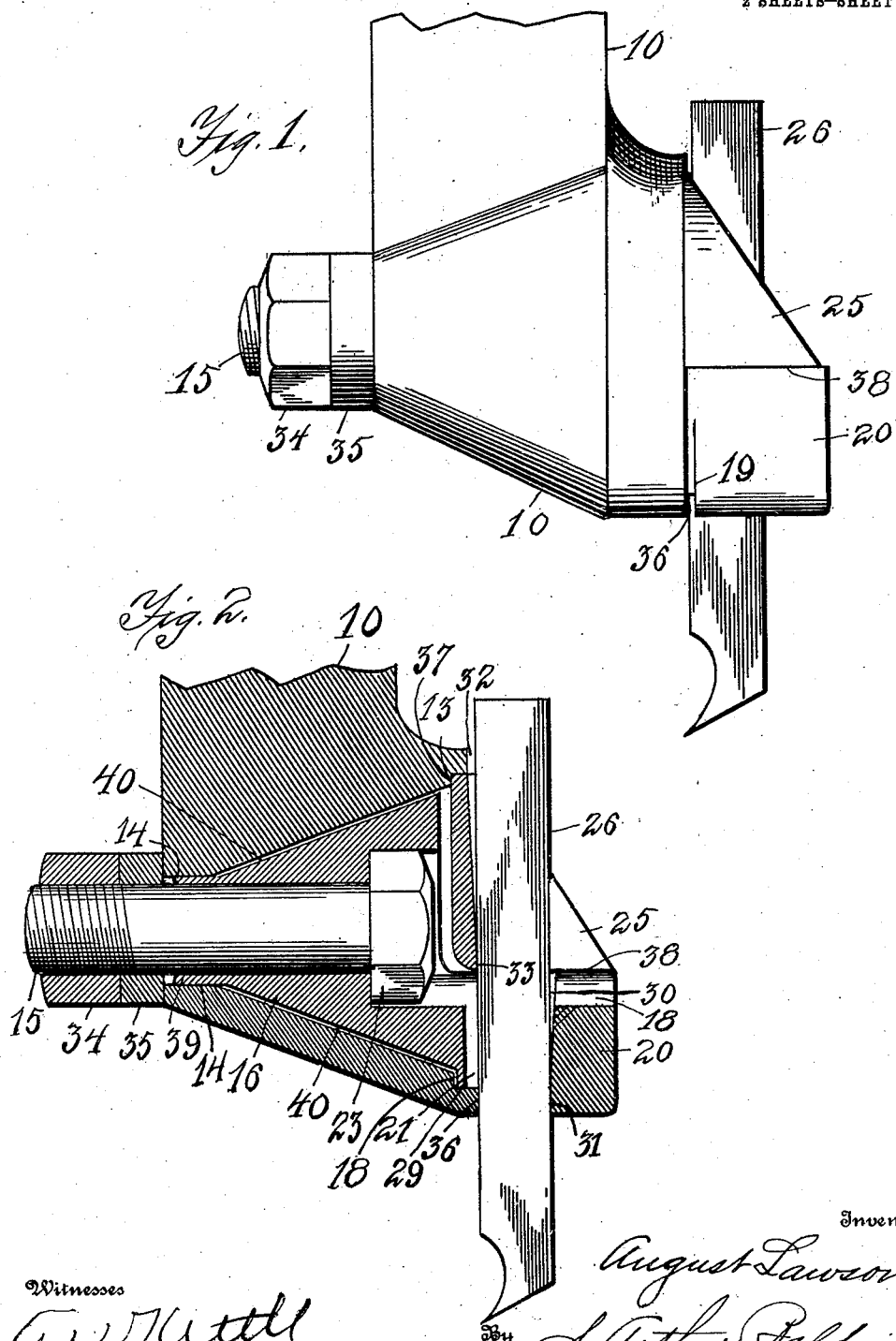

UNITED STATES PATENT OFFICE.

AUGUST LAWSON, OF JAMESTOWN, NEW YORK, ASSIGNOR OF ONE-HALF TO NELS A. JOHNSON, OF JAMESTOWN, NEW YORK.

TOOL-HOLDER.

987,307. Specification of Letters Patent. Patented Mar. 21, 1911.

Application filed June 30, 1909. Serial No. 505,181.

*To all whom it may concern:*

Be it known that I, AUGUST LAWSON, a citizen of the United States, residing at Jamestown, in the county of Chautauqua, State of New York, have invented new and useful Improvements in Tool-Holders, of which the following, taken in connection with the accompanying drawings, is a full, clear, and exact description.

The invention relates to holders for tools for cutting metal by machinists; and the object of the invention is to provide a revoluble tool holder which will cut at any angle and which holds the tool in a peculiar manner whereby it is exceedingly firm not "chattering" or "digging" but taking a steady even cut; and the invention consists in the combination and arrangement of the parts, as shown in this description and drawings and pointed out in the claims.

In the drawings Figure 1 is a side elevation of the tool holder with the tool in place, the shank being broken away; and Fig. 2 is a vertical sectional view of the same. Fig. 3 is a side elevation and Fig. 4 a plan view of the swivel mounted portion of the tool holder. Fig. 5 is a plan view of the conical opening within which is swivelly mounted the portion of the tool holder shown in Figs. 3 and 4. Figs. 6 and 7 show both end and rear elevations of the resistance plate for the upper end of the cutting tool. Fig. 8 is a rear elevation of the complete tool holder showing the cutting tool turned at an angle.

Similar numerals refer to corresponding parts in the several views.

The numeral 10 indicates the tool holder shank which at its lower end or head is formed with a conical shaped opening 11 which extends therethrough. The outer rim 12 of the cone-shaped head of shank 10 is extended sufficiently far to the rear of shank 10 to bring the front cutting face of the tool 26 vertically under the pivotal point of the apron of the planer. This also permits the tool 26 to be turned and held at any angle, as shown in Figs. 1 and 8. Around the inner side of the rear outer rim 12 of the cone-shaped opening 11 a circular angular cut 13 is provided for a purpose hereinafter set forth.

The small end 14 of the cone-shaped opening 11 is made straight for some distance so as to give a broad, strong bearing on the under side of part 14 and the diameter of the opening is somewhat larger than the cap bolt 15 which holds the parts together, in order to receive between said cap bolt and the inner side of the portion 14 the straight sleeve shaped end 39 of the swivel or revolubly mounted part 16 of the tool holder, thereby giving a strong, clean, straight bearing 14.

The numeral 16 indicates the swivel mounted portion of the tool holder which is cone-shaped on its outer side, as shown at 17 at one end, so as to fit loosely within the cone-shaped opening 11, a space 40 being allowed around the cone 17 for leeway so that the inner side of the cone-shaped opening 11 does not touch the cone 17, the bearing being only at the points 14 and 29. The cone 17 ends at its larger end, for about one-half its diameter, a short distance within the angular cut 13 in the cone-shaped opening 11, and the remaining lower half has the projecting angular face 18 which projects within the angle 13 to keep it in place but does not bear against said angle 13. A second angular face 19 is provided which does not bear against the face of the rim 12, being separated a short distance from said face in order to allow the pressure of said face to come against the cutting tool 26, thereby clamping the cutting tool firmly in place, as shown in Fig. 1. Said lower half of the revolubly mounted portion 16 extends out in a tool holding portion 20 through which the opening 21 is provided for the cutting tool. The opening 21 for the cutting tool is made sufficiently large and is so placed that the draw of the bolt 15 will invariably draw the cutting tool 26 against the rim 12, as shown at 36. The upper face of the portion 20 is hollowed out as at 22 to admit the head 23 of bolt 15, to the hole 24, which hole extends through the cone-shaped portion 17 of part 16, which is enlarged at its rear end to receive the head 23, as shown in Fig. 2.

A resistance plate 25 is provided for holding the cutting tool 26 firmly in line on part 16. The plate 25 is preferably triangular shape when viewed endwise and semicircular in form to fit within one-half of the angular cut 13 and having a straight notch 27 down through the center of the same to receive the tool 26 therethrough. The part 25 is loosely attached to rear face of the swivel portion 16 by a screw in hole 28 so that the parts will not become disengaged when assembling the same. The opening 21 through rear projection 20 is cut with a rear bevel 30, toward the upper end of the opening so as to insure the tool 26 bearing firmly near the lower edge 31 of the cut. The upper portion 32 of the cut 27 through part 25 is also cut away slightly so as to give a firm bearing for the tool 26 at the point 33 near the front lower edge of the part 25.

The bolt 15 is held by a suitable nut 34 and steel washer 35 so that if the parts are assembled as shown in Figs. 1, 2, and 8, the tool 26 may be quickly and readily released by unscrewing nut 34 and may be clamped firmly in place by tightening said nut. The resistance plate 25 on the rear end of the swivel bolt 15 forms said bolt into a two part bolt. The draw of the resistance plate 25 against the cutting tool causes said resistance plate to bind against the horizontal face of the angular cut 13, spreading the resistance plate from the remainder of the bolt sufficiently to accomplish this purpose. The bearing points upon the tool 26 when the cutting strain is upon it will be at the points 31 and 33, and all the bearing points on the tool holder will be the under side of bearing 14, the points 31, 33, 37 and 38. It is thus apparent that the strain upon the cutting tool 26 will be down the lower bevel 40 from the point 14 to the point 36 with rear pressure at the point 31. The pressure upon the point 33 of resistance or clamping block 25 presses said block 25 down upon the face of rear part 20 at 38, thereby pressing block 25 against the angular face 13 at 37. The tool is thus rigidly held in the tool holder in such a manner that it may spring slightly without in any wise loosening this rigid hold of the clamping parts on the tool. The rearward projection of the lower end of the tool holder permits of the placing of this rearward projection beneath the end of the apron or latch of the planer to which the tool holder is attached, so that when too great a strain comes upon the tool as it is clamped against the rear side of said projection, it will ease itself without digging into the metal since said rearward projection brings the tool into line so that it springs on an ascending arc instead of a descending as would be the case of a straight tool on the front of the latch and hence when it so springs it will cut less metal instead of more. The rearward projection also provides a rim with a face 36 against which the revolubly mounted tool 26 may be rigidly clamped at any desired angle in a manner hereinbefore described. That is, the cutting edge of the tool may project in any desired direction from said rim and be clamped firmly in said desired position. It is also obvious that my tool holder is adapted for use upon any of the common forms of planer latches, the length of the rearward projection being varied for the different uses, and the construction permits of the tool holder being made any desired size so as to stand the heaviest forms of work and firmly hold the cutting tool to its work, giving it a smooth straight cut.

I claim as new:

1. A tool holder comprising in combination, a shank having a transverse conical bearing, a member adapted to receive a tool vertically therein slidably mounted in said bearing, means for binding said tool between said bearing and said receiving member, and a member coöperating with said bearing to bind said tool in addition to said bearing and receiving member.

2. A tool holder comprising in combination, a shank having a transverse conical bearing, a member adapted to receive a tool vertically therein slidably mounted in said bearing, means for binding said tool between said bearing and said receiving member, and means coöperating with the last mentioned elements to support said tool at three points.

3. A tool holder comprising a shank having a projection beyond its rear side near its lower end, said lower end of said shank having a hole therethrough within said projection, said projection having an angular circumferential shoulder around the mouth of said hole adjacent its rear face, and means mounted in said hole to rigidly clamp and hold the cutting tool at different angles against the side of said circumferential shoulder and the rear side of said projection.

4. A tool holder comprising a shank having a rim projecting beyond its rear side near its lower end, said lower end of said shank having a hole therethrough from front to rear within said projecting rim, a two part bolt revolubly mounted in said hole, and means for spreading the parts of said two part bolt to hold against the inner side of said hole through said shank and clamp the cutting tool against the rear side of said projecting rim.

5. A tool holder comprising a shank having an opening from front to rear through its lower end, a member revolubly mounted in said opening, a bolt to hold said member, said revolubly mounted member having an opening therethrough, crosswise of and adjacent the rear side of said shank for the cutting tool, and a clamping piece on said revolubly mounted part to aid in holding said tool.

6. A tool holder comprising a shank having a head with a rearward projection therefrom, a cone-shaped opening through said head, a cone-shaped portion swivel mounted in said cone-shaped opening, said swivel mounted portion having a crosswise opening therethrough for the cutting tool, and a clamping plate on said swivel mounted portion to aid in the rigid holding of said tool.

7. A tool holder comprising a shank, a rearward projection on the lower end of said shank having an opening therethrough, a portion swivel mounted in said opening, said swivel mounted portion having a crosswise opening therein for the cutting tool, and a resistance plate for the cutting tool on said swivel mounted portion, the cutting tool clamped and released by the draw of said swivel mounted portion and said resistance plate.

8. A tool holder comprising a shank having a rearward projection on its lower end, said lower end having a cone-shaped opening crosswise therethrough, a cone-shaped part to fit said cone-shaped opening and revolubly mounted therein, a rearward extension on said cone-shaped part having an opening therethrough for holding the cutting tool crosswise of the rear face of said rearward extension, a clamping plate on said rearward extension of said cone-shaped part having a bearing on said rearward projection of said shank, and a bolt through said cone-shaped part to clamp the cutting tool against said rearward projection of the shank and said clamping plate, substantially as and for the purpose specified.

9. A tool holder comprising a shank having a rearwardly projecting cone-shaped head, said cone-shaped head having a cone-shaped opening therethrough with an angular circumferential cut adjacent the rim around its larger end, a cone-shaped portion to revolubly fit within said cone-shaped opening and having a hole therethrough, a bolt in said hole to draw the parts together, a tool holding extension on said cone-shaped portion having a crosswise opening therethrough for the cutting tool adjacent said rearward projecting rim of the shank head, a semi-circular clamping plate to bear against the angular circumferential cut adjacent said rim on one side and to bear upon said tool holding extension on another side, said semi-circular plate having a groove for the cutting tool in line with the opening in said extension, substantially as shown and described.

In testimony whereof I have signed my name to this specification in the presence of two subscribing witnesses.

AUGUST LAWSON.

Witnesses:
A. W. KETTLE,
I. A. ELLSWORTH.

---

Copies of this patent may be obtained for five cents each, by addressing the "Commissioner of Patents, Washington, D. C."